United States Patent [19]

Katayama, deceased et al.

[11] Patent Number: 5,169,563

[45] Date of Patent: Dec. 8, 1992

[54] WATER TREATMENT AGENT AND WATER TREATMENT METHOD FOR A BOILER

[75] Inventors: Sakae Katayama, deceased, late of Nishinomiya, by Hirohiko Katayama, executor; Sadaoki Kanada, Ibaraki; Kazuo Marugame, Kawachinagano; Hiroshi Asai, Higashiosaka, all of Japan

[73] Assignee: Katayama Chemical Inc., Osaka, Japan

[21] Appl. No.: 798,521

[22] Filed: Nov. 26, 1991

Related U.S. Application Data

[63] Continuation-in-part of Ser. No. 550,533, Jul. 10, 1990, abandoned.

[30] Foreign Application Priority Data

Jul. 14, 1989 [JP] Japan .................. 1-183296
Jul. 21, 1989 [JP] Japan .................. 1-189060

[51] Int. Cl.$^5$ .................. C23F 11/18; C23F 11/14
[52] U.S. Cl. .................. 252/389.53; 252/389.54; 252/389.1; 252/390; 252/389.62; 252/181; 252/392; 252/394; 252/396; 210/700; 210/701; 422/17; 422/19
[58] Field of Search ........... 252/389.1, 389.54, 389.53, 252/390, 392, 394, 396, 181; 210/700, 701; 422/17, 19

[56] References Cited

U.S. PATENT DOCUMENTS

| | | | |
|---|---|---|---|
| 3,095,862 | 7/1963 | Berner | 252/180 X |
| 3,116,105 | 12/1963 | Kerst | 422/16 |
| 3,277,104 | 10/1966 | Riggs | 252/390 |
| 3,458,453 | 7/1969 | Kautsky et al. | 252/390 |
| 3,790,496 | 2/1974 | Hausler | 252/390 |
| 3,907,612 | 9/1975 | Atkiss et al. | 148/18 |
| 4,120,655 | 11/1978 | Crambes et al. | 252/389.2 X |
| 4,185,071 | 1/1980 | Sujdak | 422/9 |
| 4,342,733 | 8/1982 | Steelkammer et al. | 252/400.2 X |
| 4,512,552 | 4/1985 | Katayama et al. | 422/16 X |
| 4,525,293 | 6/1985 | Kisil et al. | 210/700 |
| 4,551,262 | 11/1985 | Samakaer et al. | 210/700 |
| 4,640,818 | 2/1987 | Grierson et al. | 252/389.53 |
| 4,717,495 | 1/1988 | Hercamp et al. | 252/396 X |
| 4,816,303 | 3/1989 | Kroenke et al. | 252/390 |
| 4,900,458 | 3/1990 | Schroeder et al. | 252/390 |

FOREIGN PATENT DOCUMENTS

| | | |
|---|---|---|
| 53-110934 | 9/1978 | Japan . |
| 0062180 | 5/1980 | Japan . |
| 0062181 | 5/1980 | Japan . |
| 57-192270a | 11/1982 | Japan . |
| 58-096881A | 6/1983 | Japan . |
| 8727157b | 6/1987 | Japan . |

*Primary Examiner*—Robert L. Stoll
*Assistant Examiner*—Valerie Fee
*Attorney, Agent, or Firm*—Cohen, Pontani, Lieberman, Pavane

[57] ABSTRACT

A water treatment agent for boilers which comprises as active ingredients a compound which can release aliphatic hydroxycarboxylic acid ions in water and a polyamine represented by the following formula (I) or an acid addition product thereof:

$$H_2H(CH_2CH_2NH)_nH \quad (I)$$

(wherein n denotes an integer of 2 to 5), and a water treatment method for pure water boilers or soft boilers using the above active ingredients to prevent corrosion of the ferrous metal in the water system of the pure water boilers or soft water boilers.

9 Claims, 2 Drawing Sheets

WATER TREATMENT AGENT AND WATER TREATMENT METHOD FOR A BOILER

CROSS-REFERENCE TO RELATED APPLICATION

This is a continuation-in-part of co-pending U.S. patent application Ser. No. 07/550,533 filed Jul. 10, 1990, now abandoned.

FIELD OF THE INVENTION

The present invention relates to a water treatment agent and a water treatment method for boilers. More particularly, the present invention relates to a water treatment agent and a water treatment method for pure water or soft water boilers which can prevent corrosion, especially pitting corrosion, of a ferrous metal in the water system of a pure water or a soft water boiler.

BACKGROUND OF THE INVENTION

Boilers in current use include raw water boilers using raw water such as industrial water, well water or the like, soft water boilers and pure water boilers. In many cases, the temperature of the water in these boilers is set at 110° C. to 400° C. under various pressures.

So-called pure water boilers use, as boiler water, water having an electric conductivity of 1.0 μS/cm or less such as pure water, ion-exchanged water or the like, from which ions such as alkali metal ions, alkaline earth metal ions (hardness causing components), sulfate ions, chlorine ions and the like are substantially removed.

In such pure water boilers, carbonate ions which are inevitably present in water due to the dissolution of carbon dioxide gas contained in air and oxygen dissolved in the water will cause corrosion of a ferrous metal. Corrosion such as pitting corrosion can easily occur and result in critical accidents.

On the other hand, soft water boilers employ soft water which is substantially free from hardness causing components (1 mg/l or less), but which contain anionic components such as sulfate ions, chloride ions or the like. The presence of the anionic components and dissolved oxygen in soft water cause corrosion of a ferrous metal in the system, especially pitting corrosion.

Therefore, pure water boilers and soft water boilers, employ a method of preventing the corrosion of the ferrous metal, specifically, pitting corrosion thereof, in which pure water or soft water is passed through a deaerator and then deoxidized by an oxygen scavenger such as a sulfite, hydrazine or the like, which is added to the water, and a phosphate anticorrosive agent which is then added to the deoxidized water, and as occasion demands, an alkali agent is added to the water so as to adjust the pH to 10 to 12. This method is called deoxidation/alkali treatment method.

However, the above-mentioned method requires troublesome deoxidation treatment and is insufficient to prevent the corrosion of a ferrous metal.

As a method of preventing or controlling corrosion of a ferrous metal in the water system of a pure water boiler, without conducting deoxidation, the inventors of this application propose a method in which a volatile amine and an aliphatic hydroxycarboxylic acid such as lactic acid, citric acid, malic acid or the like are added to pure water (Japanese Patent Laid-Open No. 58-96881).

As anticorrosive agents which can prevent or suppress the corrosion of a ferrous metal in the water system of pure water or soft water boilers without conducting deoxidation, the inventors also propose the following agents:

a four-ingredient anticorrosive agent containing as effective ingredients, (a) at least one compound selected from the group consisting of molybdic acid, tungstic acid and nitrous acid and an alkali salt thereof, (b) an aliphatic hydroxycarboxylic acid or an alkali salt thereof, (c) a compound which can easily release metal ions in water, and (d) a polymer or copolymer of an olefinic compound which has molecular weight of 500 to 100,000 and is soluble in water (Japanese Patent Publication No. 62-57715: U.S. Pat. No. 4,512,552); and a five-ingredient anticorrosive agent containing the above four ingredients and a monoamine having 2 to 8 carbon atoms (Japanese Patent Publication No. 62-27157).

In recent years, however, the capacity of a water purifying apparatus for supplying pure water, ion-exchanged water, soft water or the like tends to become insufficient with an increase in evaporation and heat transfer load of a boiler, as compared with the water-holding capacity thereof.

As a result, ion ingredients such as alkali metal ions, sulfate ions, chloride ions or the like are added into the water system of a pure water boiler so that the electric conductivity of the water supplied to the pure water boiler exceeds 1 μS/cm. Further, the water hardness of a soft water boiler is frequently increased to 20 mg/l or more by addition of such hardness causing components to the water of a soft water boiler (hardness leak) under circulation.

Moreover, a silicate or iron component is also frequently incorporated in the water due to a limitative capacity of a water purifying apparatus, water softener or an ion-exchange resin.

When the method disclosed in Japanese Patent Laid-Open No. 58-96881 is performed in the water system of a pure water boiler having such various impurities incorporated therein, the anticorrosive effect is deteriorated. This tendency is remarkable when the electric conductivity of the water supplied to the pure water boiler exceeds 1.0 μS/cm, and when the content of the ferrous components exceeds 0.1 mg/l.

On the other hand, the addition of the anticorrosive agent, which is disclosed in Japanese Patent Publication No. 62-27157 or 62-57715, to the water system of a soft water boiler in which the hardness components are included, causes a nonuniform deposition of a black anticorrosive film due to the adhesion of scales to the surface of a ferrous metal. As a result, the anticorrosive effect on the ferrous metal is sometimes made insufficient. This tendency is remarkable when the content of hardness components exceeds 20 mg/l.

Although the polyamine represented by the formula (I) described below and used in the present invention has been known as a water treatment agent for boilers (Japanese Patent Publication No. 50-35601), the use of such a polyamine in combination with other compounds, as in the present invention, and the effect thereof have not been known.

SUMMARY OF THE INVENTION

An object of the present invention is to provide a water treatment agent and a water treatment method which are capable of preventing the corrosion of a ferrous metal in a water system, without conducting deoxidation treatment.

To this end, the present invention provides a water treatment agent for boilers which contains, as ingredients, a compound which can release aliphatic hydroxycarboxylic acid ions in water and a polyamine represented by the following formula (I):

(wherein n denotes an integer of 2 to 5) or an acid addition salt thereof.

The present invention also provides a water treatment method for pure water boilers comprising, adding to the water system of a pure water boiler, (a) a compound which can release aliphatic hydroxycarboxylic acid ions in water, and (b) a polyamine represented by the following formula (I):

(wherein n denotes an integer of 2 to 5) or an acid addition salt thereof so that an amount of each of the ingredients (a) and (b) is 0.2 to 50 epm so as to prevent the corrosion of a ferrous metal in the water system of the pure water boiler.

The present invention further provides a water treatment method for soft water boilers comprising adding to the water system of a soft water boiler, the following ingredients:

(a) 50 to 5,000 mg/l of a compound which can release aliphatic hydroxycarboxylic acid ions in water;

(b) 20 to 5,000 mg/l of a polyamine represented by the following formula (I):

(wherein n denotes an integer of 2 to 5) or an acid addition salt thereof;

(c) 1 to 100 mg/l of at least one compound selected from the group consisting of molybdic acid, tungstic acid, nitrous acid and an alkali salt thereof; and (d) a heavy metal compound, which can release zirconium, tin, manganese or nickel ions, in an amount of 0.5 to 100 mg/l in terms of metal ion;

so as to prevent the corrosion of a ferrous metal in the water system of the pure water boiler.

The present invention has been achieved on the basis of the findings that (1) when the specific amounts of the above-mentioned two ingredients (a) and (b) are added to the water system of a pure water boiler, a strong, dense and anticorrosive black film consisting of $Fe_3O_4$ is formed on the surface of the ferrous metal of the boiler water system, (2) the black film can exert an anticorrosive effect without using an oxygen scavenger, and (3) that findings (1) and (2) are also observed in a boiler water system containing impurity ingredients.

DETAILED DESCRIPTION OF THE PREFERRED EMBODIMENTS

Figure 1:
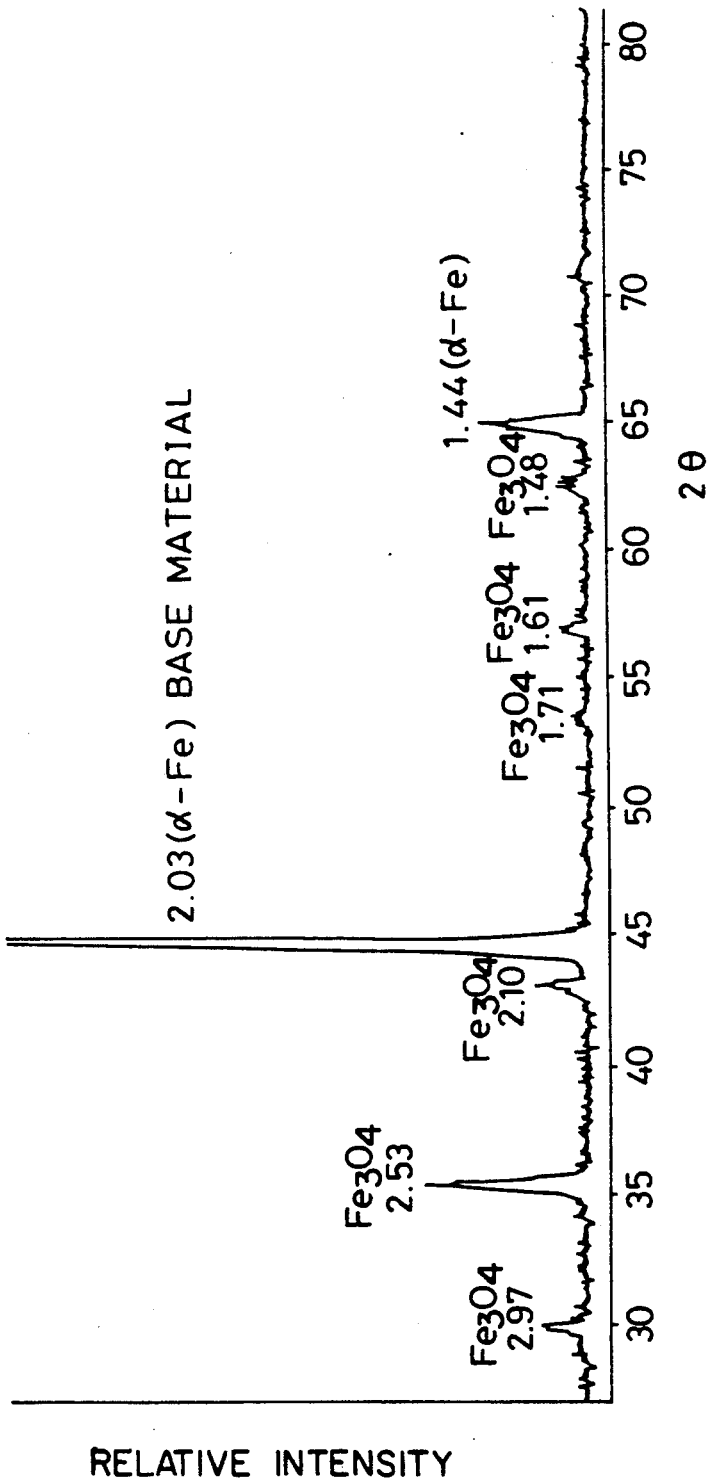
FIG. 1 is view showing the X-ray diffraction chart of the anticorrosive film formed when a water treatment method of the present invention is carried out.

The term "water system of a pure water boiler" used herein means the apparatus system of a pure water boiler in which the boiler water supplied is present and circulated.

The term "boiler water" used herein means the water used as feed water in a pure water boiler, basically including pure water, ion-exchanged water and condensate water thereof. The boiler water also includes water containing impurities as described above, for example, water having an electric conductivity of more than 1.0 μS/cm and containing ferrous components at a concentration of more than 0.1 mg/l. The present invention is particularly effective for a case wherein such impurities are mixed in the boiler water.

Examples of compounds which can release aliphatic hydroxycarboxylic acid ions include lactic acid, citric acid, malic acid, tartaric acid, mannonic acid, gluconic acid and glucono-δ-lactone. Intramolecular esters may be used which can be converted into aliphatic hydroxycarboxylic acids by hydrolysis in the water system. The salt of the aliphatic hydroxycarboxylic acid (for example, a sodium, potassium or ammonium salt or the like) is as a rule unsuitable for use in the pure water system with the exception described below, since its use increases the impurity cations in the boiler water and deteriorates the function of the aliphatic hydroxycarboxylic acid ions.

Examples of the polyamines represented by the formula (I) and acid addition products thereof include diethylenetriamine, triethylenetriamine, tetraethylenepentamine, pentaethylenehexamine, and hydrochloride, nitrate, sulfate and the like thereof. In general, it is unsuitable to employ such polyamines in the form of an acid addition salt from the viewpoint of preventing the increase in impurity anions in the boiler water and the deterioration of the function of the polyamines.

Any one of the aliphatic hydroxycarboxylic acids and any one of the polyamines may be used in the form of a salt thereof.

In the present invention, the compound (referred to as "ingredient (a)" hereinafter) which can release an aliphatic hydroxycarboxylic acid ion in water is added to the water system of a pure water boiler in an amount of 0.2 epm to 50 epm. The polyamine (referred to as "ingredient (b)" hereinafter) is also added to the water system in an amount of 0.2 epm to 50 epm. The unit "epm" means milligram equivalent/l. If an amount of either one of the ingredients (a) and (b) is less than 0.2 epm, the intended anticorrosive effect cannot be obtained, while an amount exceeding 50 epm, will not result in an improvement in the anticorrosive effect in proportion to the increase in the amount.

However, if the alkali metal ions and the sulfate ions or chloride ions are unbalanced in pure water boiler which may contain them (including a case wherein the amount of either one of the ions is substantially zero), the effectiveness of the ingredient (a) or (b) may be lowered by excess ions in the balanced state. For example, if excessive alkali metal ions are present, ingredient (a) may be changed to its alkali metal salt form in water in an amount corresponding to the excess equivalent, resulting in a lowering of the anticorrosive activity. If the sulfate ions or chloride ions present are excessive, ingredient (b) may be changed to its acid addition salt in an amount corresponding to the excess equivalent, resulting in a lowering of the anticorrosive activity. In such a case, therefore, it is preferable to increase the amount of the ingredient (a) or (b) by an amount corresponding to the equivalent of excess alkali metal ions, sulfate ions or chloride ions.

In the present invention, the ingredients (a) and (b) are preferably added to the water system of a pure water boiler in such a manner that the molar ratio between the ingredients (a) and (b) is 12:1 to 1:10, preferably 6:1 to 1:5, within the above-mentioned ranges. It is more preferable from the viewpoint of corrosion prevention that the ratio by epm of ingredient (b) to ingredient (a) is not less than 1.

On the other hand, if in the water system of a pure water boiler, a silicate is present as an impurity, a sodium or potassium salt of an aliphatic hydroxycarboxylic acid can be used as ingredient (a) either alone or as a part thereof. Since the sodium or potassium in the aliphatic hydroxycarboxylate readily combines with the silicate component to form a silicate, the water system is assumed to establish the same state as if an aliphatic hydroxycarboxylic acid had been used. This is advantageous because the occurrence of possible silica scales is prevented due to the high solubility of the silicate thus formed.

When ingredients (a) and (b) are added to the water system of a pure water boiler and used therein in the above effective amounts, a strong anticorrosive film is formed on the surface of the ferrous metal in the water system. Moreover, it has been confirmed that this film consists of tri-iron tetroxide, which is extremely dense and has no defective portion with a uniform thickness.

It has also been confirmed that the film of tri-iron tetroxide reaches the surface layer of the base material (iron material). It is also expected that, since no organic compound such as a polyamine (i.e., the ingredient (b)) or the like, is included in the film, the ingredient (a) has some catalytic action. The film has an anticorrosive effect and is not affected by the impurities, carbonate ions (having a function to produce and accelerate corrosion) and the dissolved oxygen, thus possessing an anticorrosive effect. The film has an advantage in that the addition of an oxygen scavenger, which was hitherto an essential step, has become unnecessary.

Although the ingredients (a) and (b) may be added simultaneously or separately, it is preferable that a preparation containing the two ingredients be first prepared and then added to the water. Particularly, it is preferable from the viewpoint of workability and preservation of the agent that the preparation containing the two ingredients be a liquid preparation. The agent is generally used in the form of a liquid preparation obtained by dissolving an effective amount of the ingredients in water. In this case, although the molar ratio of the ingredient (a) and the ingredient (b) in the agent (aqueous liquid type) can be appropriately specified in accordance with the above-described treatment method, the ratio is generally 12:1 to 1:10, preferably 6:1 to 1:5. The ratio by epm of the ingredient (b) to the ingredient (a) is preferably not less than 1 from the viewpoint of corrosion prevention.

On the other hand, in the water system of a soft water boiler, it is recommended that the above-described ingredients (a) and (b) be used together with the following ingredients:

(c) at least one compound selected from the group consisting of molybdic acid, tungstic acid, nitrous acid and an alkali salt thereof; and (d) a heavy metal compound which can release zirconium, tin, manganese or nickel ions in water.

The above combination permits the formation of a strong anticorrosive film and the performance of the anticorrosive treatment which is not affected by hardness contaminants and dissolved oxygen.

The term "water system of a soft water boiler" used herein means the system of a soft water boiler in which the boiler water supplied is present and circulated.

The term "boiler water" used herein means the water used as feed water in a soft water boiler, and basically includes soft water and concentrated water thereof. As described above, the boiler water also includes water which contains hardness components (as leaked), for example, up to about 20 to 400 mg/l. The present invention is particularly effective for such water.

The alkali salts of ingredient (c) include sodium, potassium and ammonium salts.

The ingredient (c) is molybdic acid, tungstic acid, nitrous acid or an alkali salt thereof, which belong to oxidative anticorrosive ingredients. One or more kinds of these compounds may be used.

The above-described ingredient (d) is a heavy metal compound which can release zirconium, tin, manganese or nickel ions in water. Examples of such heavy metal compounds include the chloride, oxychloride, nitrate, sulfate and the like, specifically zirconium chloride, zirconium sulfate, zirconium nitrate, zirconyl chloride, zirconyl nitrate, zirconyl sulfate, stannous chloride, stannic chloride, stannous sulfate, manganese chloride, manganese sulfate, nickel chloride, nickel sulfate, nickel nitrate and the like.

The above-described ingredients (a) to (d) are added to the soft boiler water in such a manner that ingredient (c) is 1 to 100 mg/l, preferably 2.5 to 100 mg/l, ingredient (a) is 50 to 5,000 mg/l, preferably 100 to 5,000 mg/l, ingredient (d) is 0.5 to 100 mg/l, preferably 1 to 100 mg/l and the ingredient (b) is 20 to 5,000 mg/l, preferably 50 to 5,000 mg/l. The amount of the ingredient (d) is based on the metal ion conversion.

If the added amount of at least one of the ingredients is smaller than the minimum value, an excellent anticorrosive effect cannot be obtained even if the other ingredients are present in effective amounts. Although the anticorrosive effect is improved by increasing the amount, from an economical viewpoint, it is rare for the need to add each of the ingredients in an amount greater than the maximum value.

Although the ingredients (a) to (d) may be added simultaneously or separately, it is preferable that a composition containing the four ingredients be prepared and then added.

It is preferable that the compounding ratio of the ingredients in the composition (water treatment composition for soft water boilers) corresponds to the above addition ratio. It is generally preferable that, if the total amount of the ingredients (a) to (d) is 100 parts by weight, the ingredient (c) is within the range of 0.01 to 58.7 parts by weight, ingredient (a) is within the range of 0.95 to 99.6 parts by weight, ingredient (d) is within the range of 0.005 to 58.5 parts by weight (in terms of metal ion), and ingredient (b) is within the range of 0.38 to 99.0 parts by weight.

The water treatment composition for soft boilers of the present invention, which contains the four ingredients, is preferably a solution from the viewpoint of workability and preservation of the composition. In this case, it is preferable to prepare the solution by first dissolving the ingredient (a) in an aqueous medium (serving as a solvent) such as water, a solvent mixture containing water and hydrophilic organic solvent, adding thereto the ingredient (d), well agitating the resultant mixture, adding the ingredient (b) and well agitating the resultant mixture, adding the ingredient (c) and then well agitating the resultant mixture to form a solution.

The total concentration of ingredients (a) to (d) in the solution is preferably 10 to 70% by weight. It is also preferable from the standpoint of forming a strong anticorrosive film, that the molar ratio between ingredients (a) and (b) be within the range of 6:1 to 1:10.

When the method of treating pure water boilers or soft water boilers of the present invention is carried out, various additives may be used in combination with the above-described essential ingredients as long as the effect of the ingredients is not thereby inhibited. The additives may be previously mixed in with the agent. Example of the additives that may be used in combination with the essential ingredients include water-soluble dispersants, pH adjustors and other anticorrosive ingredients, which are known in the art.

Examples of such water-soluble dispersants include homopolymers of monomers such as acrylic acid, methacrylic acid and maleic acid, copolymers of at least two monomers thereof, copolymers of the monomers with other compounds which respectively have other ethylenic double bonds, each of which is copolymerizable with any one of the monomers and contains 20 mol % or more of the monomer ingredient, and mixed polymers containing at least two of the homopolymers and copolymers. Preferred polymers are those being water-soluble and having a molecular weight of 500 to 100,000.

Other examples of usable water-soluble dispersants include the following compounds:

Phosphonic acid derivatives represented by the following formula (2) or (3);

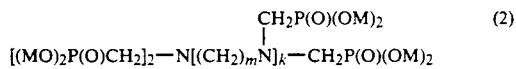

(wherein k denotes 0 or an integer of 1 or 2, m denotes an integer of 2 to 6, and M denotes a hydrogen atom, sodium or potassium),

(wherein X denotes OH or $NH_2$ and M denotes a hydrogen atom, sodium or potassium);

Bis(poly-2-carboxyethyl)phosphinic acid represented by the following formula:

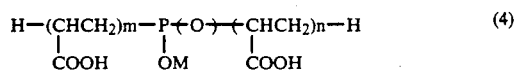

(wherein M denotes a hydrogen atom, sodium or potassium, and m and n integers such that the sum of m+n is an integer of 4 to 20; and Amino-substituted phosphinic acid derivatives represented by the following formula (5)

and salt thereof wherein A is a random polymeric residue comprising at least one unit of formula II

and at least one unit of formula III, different from a unit of formula II,

and B is a hydrogen atom or a residue A; wherein m and n are integers such that the sum of m+n is an integer of from 3 to 50, R is a hydrogen atom, methyl or ethyl;

$R_1$ is a residue —OX, wherein X is a hydrogen, sodium, potassium, ammonium or an amine residue;

$R_2$ is a hydrogen atom $R_3$ is a hydrogen atom $R_4$ is a residue of $—CONR_7R_8$, wherein $R_7$ and $R_8$ are the same or different and each is a hydrogen atom, a straight or branched chain alkyl residue having 1 to 8 carbon atoms, hydroxymethyl or a residue $—C(CH_3)_2CH_2SO_3M$ where M is a hydrogen atom, sodium or potassium.

Examples of the pH adjustors used in the present invention include alkali metal hydroxides such as sodium hydroxide or potassium hydroxide and ammonia, all of which are used for adjusting the pH to an alkaline side, and hydrochloric acid, sulfuric acid, nitric acid and the like, all of which are used for adjusting pH to an acidic side. Any one of the pH adjustors is added in accordance with the optimum pH for pure water or soft water boilers to which the pH adjustor is added. When copper or an aluminum family metal is present in the water system, ammonia should not be added. Nitric acid and hydrochloric acid should not be added in the usual case.

Examples of other preferable anticorrosive ingredients used in the present invention include monoamines having 2 to 8 carbon atoms such as propylamine, butylamine, morpholine, cyclohexylamine, ethanolamine, prophanolamine, aminomethylpropanol and the like which are generally known as anticorrosive agents for condensate systems. Such anticorrosive ingredients are preferred to be those which are not related directly to the formation of the anticorrosive film in the present invention and can prevent corrosion in the steam condensed system in a boiler apparatus. When an anticorrosive ingredient forms a salt with the ingredient (a) or (c), it may be added in the form of a salt.

EXAMPLE

The present invention is described in detail below with reference to the examples below.

PURE WATER BOILER

Test Example 1

The effect of a treatment agent in a pure water boiler was examined by using an autoclave. A predetermined amount of the agent was added to 500 ml of pure water, and the resultant mixture was then charged to the autoclave. A soft steel specimen (trade name, SPCC; $30 \times 50 \times 1$ mm) was then attached to a stirring rod, which was interlocked with a motor so that the specimen could be rotated, and immersed in the test solution contained in the autoclave. After the autoclave had been closed, a test was made for 72 hours under rotation at 100 rpm (100 rotations per minute) of the specimen attached to the stirring rod and under such conditions that the pressure in the autoclave was 100 $Kg/cm^2$ in terms of saturated vapor pressure, and the water temperature was 310° C. After the test, the specimen was discharged from the autoclave, and the surface thereof was observed. The specimen was then immersed in a hydrochloric acid solution for washing for the purpose of measuring the corrosion speed thereof, i.e., a corrosion amount per day per $dm^2$ (mdd), in accordance with the method of JISK0100. However, in the examples of the present invention in which both the ingredients (a) and (b) are used, since the film formed on the specimen was not removed, the time taken for immersing the specimen in the hydrochloric acid solution for washing was 4 times (1 minute) the regular time. In such combination systems, therefore, the corrosion speed (mdd) was determined by immersing the specimen in the hydrochloric acid solution for washing for 1 minute. The results obtained are shown in Table 1. The test water used was prepared by adding sodium chloride to pure water having an electric conductivity of 1.0 $\mu S/cm$ or less so as to increase the conductivity to 200 $\mu S/cm$ (the concentration of sodium chloride, about 95 mg/l). The concentration of dissolved oxygen in the test water before the test was 9.0 mg/l.

When a compound, which can produce carboxylic acid ions in water, was singly used in a test or when the pH of the test water used was 9.0 or less, the pH of the test water, to which the agent was added, was adjusted to 9.0 by adding sodium hydroxide thereto and then subjected to the test. Since sodium chloride was added on the assumption that anions and cations leak, the concentrations by mole of the anions and cations, which are leak components, are equal to each other. There is thus no need for neutralization using the ingredients (a) and (b) shown in Table 1, and the amount of each of the ingredients added is also shown in Table 1.

TABLE 1

| Test No. | Agent under Test (epm) | Corrosion speed (mdd) | Number of pitting (number/$dm^2$) | Presence of anti-corrosive film |
|---|---|---|---|---|
| Example | | | | |
| 1 | Citric acid (0.3) + Diethylenetriamine (0.3) | 0.2 | 0 | Yes |
| 2 | Citric acid (1.2) + Diethylenetriamine (0.2) | 0.1 or less | 0 | Yes |
| 3 | Citric acid (0.5) + Diethylenetriamine (0.5) | 0.1 or less | 0 | Yes |
| 4 | Citric acid (0.2) + Diethylenetriamine (1.0) | 0.1 or less | 0 | Yes |
| 5 | Citric acid (1.0) + Diethylenetriamine (1.0) | 0.1 or less | 0 | Yes |
| 6 | Gluconic acid (1.0) + Diethylenetriamine (1.0) | 0.1 or less | 0 | Yes |
| 7 | Malic acid (1.0) + Diethylenetriamine (1.0) | 0.1 or less | 0 | Yes |
| 8 | Tartaric acid (1.0) + Diethylenetriamine (1.0) | 0.1 or less | 0 | Yes |
| 9 | Glucono-δ-lactone (1.0) + Diethylenetriamine (1.0) | 0.1 or less | 0 | Yes |
| 10 | Citric acid (1.0) + Triethylenetetramine (1.0) | 0.1 or less | 0 | Yes |
| 11 | Citric acid (1.0) + Tetraethylenepentamine (1.0) | 0.1 or less | 0 | Yes |
| 12 | Citric acid (1.0) + Pentaethylenehexamine (1.0) | 0.1 or less | 0 | Yes |
| 13 | Citric acid diethylenetriamine addition salt (1.0) | 0.1 or less | 0 | Yes |
| Comparative Example | | | | |
| 14 | Citric acid (2.0) | 7.6 | Many[*3] | No[*1] |
| 15 | Gluconic acid (3.0) | 5.1 | Many | No[*1] |
| 16 | Diethylenetriamine (2.0) | 7.7 | Many | No[*1] |
| 17 | Triethylenetetramine (2.0) | 7.5 | Many | No[*1] |
| 18 | Tetraethylenepentamine (2.0) | 7.3 | Many | No[*1] |
| 19 | Pentaethylenehexamine (2.0) | 7.3 | Many | No[*1] |
| 20 | Citric acid (0.1) + Diethylenetriamine (2.0) | 3.5 | 7 | No[*1] |
| 21 | Citric acid (2.0) + Diethylenetriamine (0.1) | 4.1 | 12 | No[*1] |
| 22 | Citric acid (1.0) + Ethylenediamine (1.0) | 8.5 | 15 | No[*1] |
| 23 | Citric acid (2.0) + Ethylenediamine (2.0) | 5.7 | 8 | No[*1] |
| 24 | Gluconic acid (1.0) + Morpholine (1.0) | 1.2 | 2 | No[*1] |
| 25 | Gluconic acid (1.0) + Cyclohexylamine (1.0) | 1.9 | 5 | No[*1] |
| 26 | Gluconic acid (1.0) + Triethanolamine (1.0) | 12.5 | Many | No[*1] |
| 27 | Trisodium phosphate (1.0) + Hydrazine hydrate (1.0) + Cyclohexylamine (1.0) | 2.7 | 0 | Yes[*2] |

[*1] Although the surface of the specimen was black, pitting corrosion occurred. It could not be said that an anticorrosive film is formed.
[*2] The surfaces of the specimen was tinged with blue.
[*3] "Many in the column "Number of pitting" of the table shows 30 number/$dm^2$ or more.

As is apparent, when the film formed in an example of the present invention (Test No. 6) was subjected to X-ray diffraction analysis, the X-ray diffraction pattern shown in FIG. 1 was obtained. The presence of triiron tetroxide was confirmed by searching for the pattern in the ASTM cards. Other iron oxides were not detected.

When the surface and a section of the film were observed with an electron microscope, it was confirmed that the film has a dense form having a uniform thickness without a defective portion.

Figure 2:
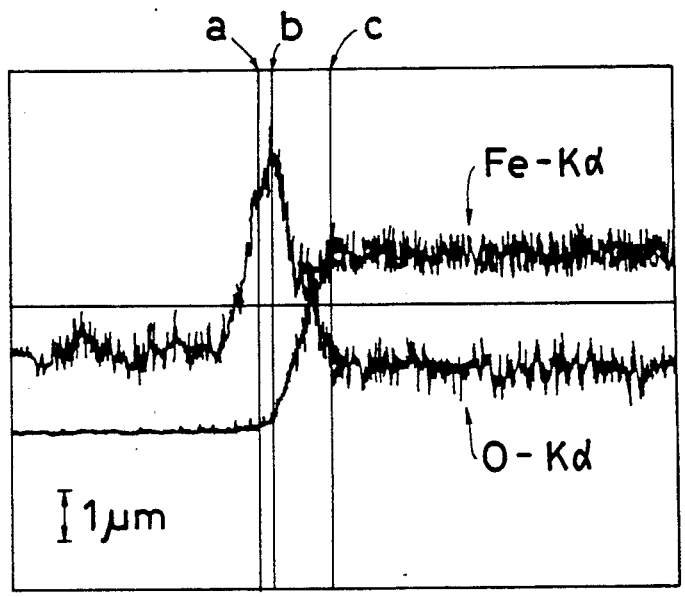
FIG. 2 is a chart of the same obtained by an X-ray microanalyzer.

When a section of the film was measured by an X-ray microanalyzer, it was confirmed that triiron tetroxide reaches the surface layer of the base material, as shown in FIG. 2. In the drawing, a denotes the surface from which the detection of Fe was started, b denotes the surface of the base material ($\alpha$-Fe), and c denotes a surface in which oxygen (O) was not detected. This demonstrates that the $Fe_3O_4$ layer (thickness, 0.3 $\mu$m) formed on the surface of the base material ($\alpha$-Fe) is present between the surfaces a and b, and that the surface layer of the base material (thickness, 0.6 $\mu$m), which was changed to $Fe_3O_4$, is present between the surfaces b and c. After all, the $Fe_3O_4$ layer is present between the surfaces a and c (thickness of 0.9 $\mu$m).

Each of the specimens, on which the film was formed, was examined with respect to IR absorption by using a reflection IR spectrometer. As a result, no organic substance was detected, and it was confirmed that neither polyalkylene, polyamine nor aliphatic hydroxycarboxylic acid is contained in the film.

EXAMPLE 1

The pure water boiler (pressure, 25 Kg/cm$^2$; evaporation loss, 23 T/H; holding water quantity, 20 m$^3$) in a certain factory generally used as a water treatment agent trisodium phosphate, hydrazine hydrate and cyclohexylamine. Since anions and cations were present, the feed water of the boiler had an electric conductivity of 2 to 6 $\mu$S/cm (average, 5.1 $\mu$S/cm) and an iron content of 0.02 to 0.3 mg/l (average, 0.15 mg/l).

When the interior of the boiler was examined, the occurrence of pitting corrosion was observed at several locations in a water tube portion, which served as a heat transfer surface and a boiler drum which served as a boiler non-heat transfer surface. The adhesion of iron oxides was observed in the upper portion of any one of the pitting corrosion portions. The progress of corrosion (local corrosion) was also observed in the lower portion of each pitting corrosion where iron oxides locally adhered. The entire surfaces of the other portions where neither pitting corrosion nor local corrosion occurred were brown. The deposits including the corrosion products in the boiler were collected, and the constituent elements of the deposits were analyzed by a fluorescent X-ray analyzer. As a result, the iron component (iron oxide), which was a main component, as well as calcium, magnesium, silica and phosphorus were detected. It is believed that the corrosion is caused by the presence of these components and the circulation thereof through the boiler due to the supply of water to the boiler.

The agent described below was added as a water treatment agent for the boiler in an amount of 5 g/l relative to the supply water of the boiler. The boiler was operated without other agents such as an oxygen scavenger and the like being added.

TABLE 1

| Test Agent | Ratio by weight (%) |
| --- | --- |
| Water | 50.0 |
| Citric acid monohydrate | 30.0 |
| Diethylenetriamine | 20.0 |

The boiler was operated under conventional conditions. Before the operation of the boiler was started, five soft steel specimens (trade name SPCC, 30×50×1 mm) were placed at positions in the boiler, and the boiler was operated. The magnification of concentration of the boiler water was about 50 times because the blow ratio of the boiler water was about 2%. The concentrations of citric acid and diethylenetriamine in the test agent contained in the boiler water were thus about 1.07 epm and about 1.46 epm, respectively. The concentration of the ingredients remaining in the boiler water was at least 0.5 epm excess of the equivalent of neutralization of the leak components comprising anions and cations during the operation of the boiler (during the test).

The boiler was operated 24 hr/day, and the test period was 132 days. After the test had been completed, the boiler was opened and examined. As a result, the deposits of iron oxide, which were observed before the test, were removed, and the iron oxide adhering to the portions where pitting corrosion or local corrosion occurred was also removed. A black film which was believed to be magnetite was formed on a corrosion portion, and no progression of corrosion was observed. The occurrence of neither corrosion nor deposits was observed at any other location.

The specimens which were placed in the boiler before the test were removed, and the surfaces thereof were observed. The corrosion speed (mdd) of each of the specimens was then measured in accordance with the method of JISK0100. The results obtained are shown in Table 2, the quality of the supply water of the boiler during the test is shown in Table 3, and the quality of the boiler water is shown in Table 4.

TABLE 2

| | Test Result | | |
| --- | --- | --- | --- |
| Specimen No. | mdd | Pitting number (number/dm$^2$) | Presence of anticorrosive film |
| 1 | 0.1 or less | 0 | Present |
| 2 | 0.1 or less | 0 | Present |
| 3 | 0.1 or less | 0 | Present |
| 4 | 0.1 or less | 0 | Present |
| 5 | 0.1 or less | 0 | Present |

TABLE 3

| Analysis of Boiler Supply Water | | | |
| --- | --- | --- | --- |
| | Average Value | Maximum Value | Minimum Value |
| pH | 9.1 | 9.4 | 8.9 |
| Electric Conductivity ($\mu$S/cm) | 5.2 | 5.9 | 2.6 |
| Total iron (mg/l) | 0.10 | 0.16 | 0.07 |

TABLE 4

| Analysis of Boiler Water | | | |
| --- | --- | --- | --- |
| | Average Value | Maximum Value | Minimum Value |
| pH | 10.2 | 10.3 | 9.7 |
| Electric | 270 | 340 | 216 |

TABLE 4-continued

| Analysis of Boiler Water | | | |
|---|---|---|---|
| | Average Value | Maximum Value | Minimum Value |
| Conductivity (μS/cm) | | | |
| Total iron (mg/l) | 5.5 | 8.3 | 1.1 |

SOFT WATER BOILER

The present invention is further described below with reference to a soft water boiler. The composition of each of the formulations utilized is expressed by % of weight, and the balance is water.

| Formulation (1) | |
|---|---|
| Sodium molybdate dihydrate | 1.0 |
| Gluconic acid (50%) | 50.0 |
| | (as 50% gluconic acid) |
| Stannous chloride dihydrate | 1.0 |
| Diethylenetriamine | 17.0 |

Gluconic acid, stannous chloride dihydrate, sodium molybdate dihydrate and diethylenetriamine were added to water in this order in the above-described compounding ratio and dissolved therein to form a liquid agent.

| Formulation (2) | |
|---|---|
| Sodium molybdate dihydrate | 1.0 |
| Glucono-δ-lactone | 25.0 |
| Stannous chloride dihydrate | 1.0 |
| Diethylenetriamine | 17.0 |

Glucono-δ-lactone was dissolved in water, and stannous chloride dihydrate, sodium molybdate dihydrate and diethylenetriamine were then added to the resultant solution in this order in the above-described compounding ratio and dissolved therein to form a liquid agent.

| Formulation (3) | |
|---|---|
| Sodium molybdate dihydrate | 0.5 |
| Malic acid | 15.0 |
| Stannous chloride dihydrate | 0.5 |
| Diethylenetriamine | 30.0 |

Malic acid was dissolved in water, and stannous chloride dihydrate, sodium molybdate dihydrate and diethylenetriamine were then added to the resultant solution in this order in the above-described compounding ratio and dissolved therein to form a liquid agent.

| Formulation (4) | |
|---|---|
| Sodium molybdate dihydrate | 0.7 |
| Citric acid monohydrate | 20.0 |
| Stannous chloride dihydrate | 0.7 |
| Diethylenetriamine | 30.0 |

Citric acid monohydrate was dissolved in water, and stannous chloride dihydrate, sodium molybdate dihydrate and diethylenetriamine were then added to the resultant solution in this order in the above-described compounding ratio and dissolved therein to form a liquid agent.

| Formulation (5) | |
|---|---|
| Sodium molybdate dihydrate | 0.7 |
| Citric acid monohydrate | 20.0 |
| Stannous chloride dihydrate | 0.7 |
| Triethylenetetramine | 30.0 |

Citric acid monohydrate was dissolved in water, and stannous chloride dihydrate, sodium molybdate dihydrate and triethylenetetramine were then added to the resultant solution in this order in the above-described compounding ratio and dissolved therein to form a liquid agent.

| Formulation (6) | |
|---|---|
| Sodium molybdate dihydrate | 0.7 |
| Citric acid monohydrate | 20.0 |
| Stannous chloride dihydrate | 0.7 |
| Tetraethylenepentamine | 30.0 |

Citric acid monohydrate was dissolved in water, and stannous chloride dihydrate, sodium molybdate dihydrate and tetraethylenepentamine were then added to the resultant solution in this order in the above-described compounding ratio and dissolved therein to form a liquid agent.

| Formulation (7) | |
|---|---|
| Sodium molybdate dihydrate | 0.7 |
| Citric acid monohydrate | 20.0 |
| Stannous chloride dihydrate | 0.7 |
| Pentaethylenehexamine | 30.0 |

Citric acid monohydrate was dissolved in water, and stannous chloride dihydrate, sodium molybdate dihydrate and pentaethylenehexamine were then added to the resultant solution in this order in the above-described compounding ratio and dissolved therein to form a liquid agent.

| Formulation (8) | |
|---|---|
| Sodium tungstate dihydrate | 0.7 |
| Citric acid monohydrate | 20.0 |
| Stannous chloride dihydrate | 0.7 |
| Tetraethylenepentamine | 30.0 |

Citric acid monohydrate was dissolved in water, and stannous chloride dihydrate, sodium tungstate dihydrate and tetraethylenepentamine were then added to the resultant solution in this order in the above-described compounding ratio and dissolved therein to form a liquid agent.

| Formulation (9) | |
|---|---|
| Sodium tungstate dihydrate | 0.7 |
| Citric acid monohydrate | 20.0 |
| Stannous sulfate | 0.7 |
| Tetraethylenepentamine | 30.0 |

Citric acid monohydrate was dissolved in water, and stannous sulfate, sodium tungstate dihydrate and tetraethylenepentamine were then added to the resultant solution in this order in the above-described compounding ratio and dissolved therein to form a liquid agent.

| Formulation (10) | |
|---|---|
| Sodium molybdate dihydrate | 0.7 |
| Citric acid monohydrate | 20.0 |
| Zirconium sulfate tetrahydrate | 0.7 |
| Tetraethylenepentamine | 30.0 |

Citric acid monohydrate was dissolved in water, and zirconyl sulfate, sodium molybdate dihydrate and tetraethylenepentamine were then added to the resultant solution in this order in the above-described compounding ratio and dissolved therein to form a liquid agent.

| Formulation (11) | |
|---|---|
| Sodium molybdate dihydrate | 0.7 |
| Citric acid monohydrate | 20.0 |
| Manganous sulfate heptahydrate | 0.7 |
| Tetraethylenepentamine | 30.0 |

Citric acid monohydrate was dissolved in water, and manganous sulfate heptahydrate, sodium molybdate dihydrate and tetraethylenepentamine were then added to the resultant solution in this order in the above-described compounding ratio and dissolved therein to form a liquid agent.

| Formulation (12) | |
|---|---|
| Sodium molybdate dihydrate | 0.7 |
| Citric acid monohydrate | 20.0 |
| Nickel sulfate heptahydrate | 0.7 |
| Tetraethylenepentamine | 30.0 |

Citric acid monohydrate was dissolved in water, and nickel sulfate heptahydrate, sodium molybdate dihydrate and tetraethylenepentamine were then added to the resultant solution in this order in the above-described compounding ratio and dissolved therein to form a liquid agent.

| Formulation (13) | |
|---|---|
| Sodium sulfite | 0.7 |
| Citric acid monohydrate | 20.0 |
| Stannous chloride dihydrate | 0.7 |
| Tetraethylenepentamine | 30.0 |

Citric acid monohydrate was dissolved in water, and stannous chloride dihydrate, sodium sulfite and tetraethylenepentamine were then added to the resultant solution in this order in the above-described compounding ratio and dissolved therein to form a liquid agent.

| Formulation (14) | |
|---|---|
| Sodium molybdate dihydrate | 0.7 |
| Citric acid monohydrate | 20.0 |
| Stannous chloride dihydrate | 0.7 |
| Triethylenetetramine | 30.0 |
| Polysodium acrylate (molecular weight = about 8000) | 2.0 |

Citric acid monohydrate was dissolved in water, and stannous chloride dihydrate, sodium molybdate dihydrate, triethylenetetramine and polysodium acrylate were then added to the resultant solution in this order in the above-described compounding ratio and dissolved therein to form a liquid agent.

| Formulation (15) | |
|---|---|
| Sodium molybdate dihydrate | 0.7 |
| Citric acid monohydrate | 20.0 |
| Stannous chloride dihydrate | 0.7 |
| Triethylenetetramine | 30.0 |
| Acrylic acid-methacrylic acid copolymer (molecular weight = about 8000, reaction molar ratio = 1:1) | 2.0 |

Citric acid monohydrate was dissolved in water, and stannous chloride dihydrate, sodium molybdate dihydrate, triethylenetetramine and acrylic acid/methacrylic acid copolymer were then added to the resultant solution in this order in the above-described compounding ratio and dissolved therein to form a liquid agent.

| Formulation (16) | |
|---|---|
| Sodium molybdate dihydrate | 0.7 |
| Citric acid monohydrate | 20.0 |
| Stannous chloride dihydrate | 0.7 |
| Triethylenetetramine | 30.0 |
| Phosphinic acid*[1] | 2.0 |

*[1]Phosphinic acid is Belclene 400 (Ciba-Geigy Corp.) which is

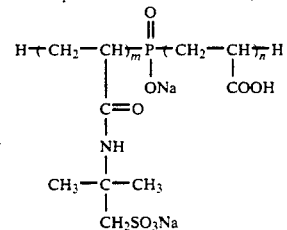

(weight-average molecular weight: about 2,000)

Citric acid monohydrate was dissolved in water, and stannous chloride dihydrate, sodium molybdate dihydrate, triethylenetetramine and phosphinic acid were then added to the resultant solution in this order in the above-described compounding ratio and dissolved therein to form a liquid agent.

(1) COMPARATIVE FORMULATION EXAMPLES (17) TO (19)

| Formulation (17) | |
|---|---|
| Sodium gluconate | 20 |
| Sodium hydroxide | 1 |
| Stannous chloride dihydrate | 1 |
| Sodium molybdate dihydrate | 1 |
| Polysodium acrylate | 2 |

Sodium gluconate was dissolved in water, and sodium hydroxide, stannous chloride dihydrate, sodium molybdate dihydrate and polysodium acrylate (molecular weight, about 8000) were then added to the resultant solution in this order in the above-described compounding ratio to form a liquid agent.

| Formulation (18) | |
|---|---|
| Sodium gluconate | 20 |
| Sodium hydroxide | 1 |
| Stannous chloride dihydrate | 1 |
| Sodium molybdate dihydrate | 1 |
| Morpholine | 10 |
| Polysodium acrylate (molecular weight, about 8000) | 2 |

Sodium gluconate was dissolved in water, and sodium hydroxide, stannous chloride dihydrate, sodium molybdate dihydrate, morpholine and polysodium acrylate (molecular weight, about 8000) were then added to the resultant solution in this order in the above-described compounding ratio to form a liquid agent.

| Formulation (19) | |
| --- | --- |
| Potassium pyrophosphate | 12 |
| Sodium hydroxide | 5 |
| Hydrazine hydrate (content, 80%) | 50 |
| Polysodium acrylate (molecular weight, about 8000) | 5 |

Potassium pyrophosphate was dissolved in water, and sodium hydroxide, hydrazine hydrate (content, 80%) and polysodium acrylate (molecular weight, about 8000) were then added to the resultant solution in this order in the above-described compounding ratio to form a liquid agent.

TEST EXAMPLE

Figure 3:
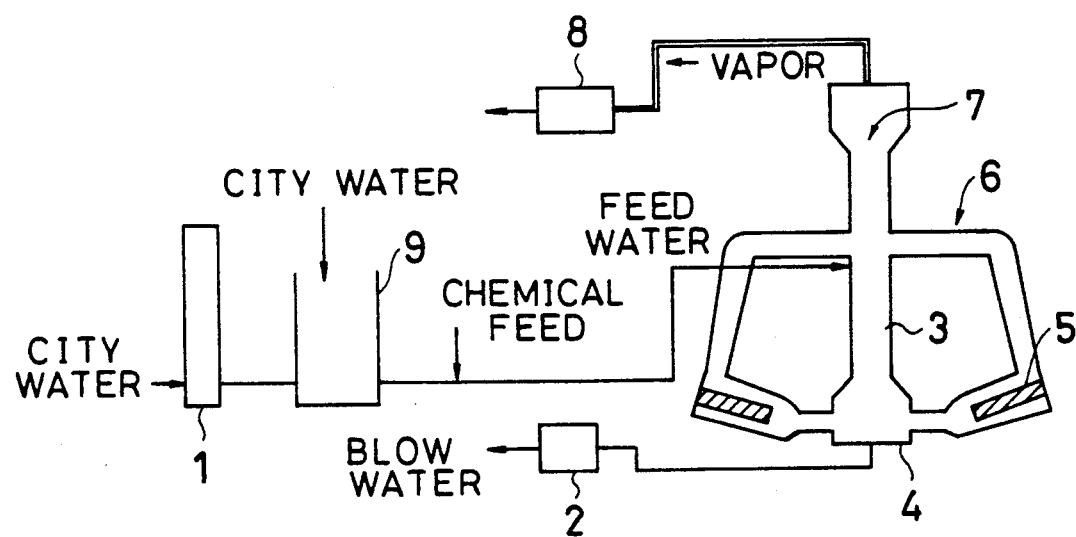
FIG. 3 is an explanatory view showing the testing apparatus used for evaluating a water treatment method of the present invention.

Test example for confirming the effect of preventing corrosion on heat-transfer iron surface and preventing adhesion of scales thereto during a leak of hardness A test was carried out by using the test apparatus shown in FIG. 3. In the drawing, reference numeral 1 denotes a hard water softener; reference numerals 2, 8 heat exchangers; reference numeral 3, a downcomer; reference numeral 4, the boiler bottom; reference numeral 5, a heat transfer test tube; reference numeral 6, an evaporation tube; reference numeral 7, a vapor reservoir; and reference numeral 9, a water feed tank.

The test water was supplied to the water supply tank 9, and a predetermined amount of agent was then added to the water. The water was supplied to the test boiler body by a pump. In the boiler body, the test water was heated to a vapor by the heat transfer test tubes (heating portion) shown in FIG. 3 and discharged to the outside of the boiler system so that the boiler water was concentrated.

FORMATION OF TEST WATER 240 l of tap water of Osaka-City was added to 560 l of water obtained by removing hardness ingredients contained in the tap water of Osaka-City by the softener shown in FIG. 3 to form test water. The results of analyses of water quality are shown in Table 5.

TABLE 5

| Analysis of test water | |
| --- | --- |
| Item | Average |
| pH | 7.3 |
| Electrical conductivity (μS/cm) | 254 |
| P-alkalinity (mg/l)*1 | 0 |
| M-alkalinity (mg/l)*1 | 56 |
| Total hardness (mg/l)*1 | 16 |
| Chloride ion (mg/l) | 30 |
| Sulfate ion (mg/l) | 26 |
| Silica (mg/l) | 7.7 |

*1 value in terms of $CaCO_3$

TEST CONDITION

Test time: 7 hours/day (including temperature rise for 1 hour and temperature falling for 1 hour) × 20 days = 140 hours
Time at a predetermined test pressure of 10 Kg/cm²: 5 hours × 20 = 100 hours
Test pressure: 10 Kg/cm²
Material of test tube: STPG38
Heat-transfer load (evaporation rate of heat transfer surface):
Heat transfer tube No. 1: about 170 Kg/m²·h high load
Heat transfer tube No. 2: about 80 Kg/m²·h low load
Heat transfer tube No. 3: about 170 Kg/m²·h high load The evaporation rate of the heat transfer surface of boilers is generally 60 to 100 Kg/m²·h, and the evaporation rate of some boilers exceeds 100 Kg/m²·h in recent years.

Area of heat transfer tube: 0.026 m² (Heat transfer tube Nos. 1 and 3)
Amount of holding water: 10 l
Evaporation about 7 Kg/h
Blow rate: about 5% (intermittently)
Test water quality: softened water of Osaka-City 70% + original tap water of Osaka-City 30%
Hardness ingredient: about 16 mg/l as total hardness
The value during a hardness leak is generally 2 to 4 mg $CaCO_3$/l.

After the test had been completed, the high-load heat transfer test tube was discharged, and the deposit (mg) of scales, the number (number/dm²) of pitting and the presence of the film were examined. The test results obtained are summarized in Table 6.

NOTE) Test Nos. 1 to 19 show the results of the tests which used the formulations (1) to (19), respectively.

Formulations (1) to (16) and (19) were added so that the concentration in the boiler water was 1000 mg/l, and Formulations (17) and (18) were added so that the concentration was 2000 mg/l.

All added amounts shown in the table are respectively shown by the concentrations in the boiler water.

TABLE 6

| Test No. | Ingredients (mg/l) | | | | Dispersant | Formulation No. | Amount of active ingredient added (mg/l) | Scale adhesion index *1 | Number of pitting (number/dm²) | Presence of film | Integrated evaluation *2 |
| --- | --- | --- | --- | --- | --- | --- | --- | --- | --- | --- | --- |
| | (c) | (a) | (d) (in terms of metal) | (b) | | | | | | | |
| | | | | | | Example | | | | | |
| 1 | Sodium molybdate (8.5) | Gluconic acid (250) | Stannous chloride dihydrate (5.3) | Diethylene triamine (170) | — | (1) | 443.8 | 24 | 0 | Yes | 4 |
| 2 | Sodium molybdate (8.5) | Glucono-δ-lactone | Stannous chloride dihyrate | Diethylene triamine (170) | — | (2) | 443.8 | 11 | 0 | Yes | 5 |

TABLE 6-continued

| Test No. | (c) | (a) | (d) (in terms of metal) | (b) | Dispersant | | Scale adhesion index *1 | Number of pitting (number/dm²) | Presence of film | Integrated evaluation *2 |
|---|---|---|---|---|---|---|---|---|---|---|
| 3 | Sodium molybdate (4.3) | Malic acid (250) (150) | Stannous chloride dihyrate (5.3) (2.6) | Diethylene triamine (300) | — | (3) | 457.0 | 12 | 0 | Yes | 5 |
| 4 | Sodium molybdate (6.0) | Citric acid (182.8) | Stannous chloride dihyrate (3.7) | Diethylene triamine (300) | — | (4) | 492.5 | 10.2 | 0 | Yes | 5 |
| 5 | Sodium molybdate (6.0) | Citric acid (182.8) | Stannous chloride dihyrate (3.7) | Triethylene tetramine (300) | — | (5) | 492.5 | 9.5 | 0 | Yes | 5 |
| 6 | Sodium molybdate (6.0) | Citric acid (182.8) | Stannous chloride dihyrate (3.7) | Tetraethylene pentamine (300) | — | (6) | 492.5 | 8.4 | 0 | Yes | 5 |
| 7 | Sodium molybdate (6.0) | Citric acid (182.8) | Stannous chloride dihyrate (3.7) | Pentaethylene hexamine (300) | — | (7) | 492.5 | 6.2 | 0 | Yes | 5 |
| 8 | Sodium tungstate (6.2) | Citric acid (182.8) | Stannous chloride dihyrate (3.7) | Tetraethylene pentamine (300) | — | (8) | 492.7 | 7.5 | 0 | Yes | 5 |
| 9 | Sodium tungstate (6.2) | Citric acid (182.8) | Stannous sulfate (3.9) | Tetraethylene pentamine (300) | — | (9) | 492.9 | 8.0 | 0 | Yes | 5 |
| 10 | Sodium molybdate (6.2) | Citric acid (182.8) | Zirconium Sulfate.4H$_2$O (2.3) | Tetraethylene pentamine (300) | — | (10) | 491.1 | 7.7 | 0 | Yes | 5 |
| 11 | Sodium molybdate (6.0) | Citric acid (182.8) | Manganese sulfate 7H$_2$O (1.4) | Tetraethylene pentamine (300) | — | (11) | 490.2 | 7.5 | 0 | Yes | 5 |
| 12 | Sodium molybdate (6.0) | Citric acid (182.8) | Nickel sulfate 7H$_2$O (1.5) | Tetraethylene pentamine (300) | — | (12) | 493.5 | 8.1 | 0 | Yes | 5 |
| 13 | Sodium nitrite (7.0) | Citric acid (182.8) | Stannous chloride dihyrate (3.7) | Tetraethylene pentamine (300) | — | (13) | 493.5 | 8.3 | 0 | Yes | 5 |
| 14 | Sodium molybdate (6.0) | Citric acid (182.8) | Stannous chloride dihyrate (3.7) | Triethylene tetramine (300) | Polysodium acrylate *3 (20.0) | (14) | 512.5 | 3.5 | 0 | Yes | 5 |
| 15 | Sodium molybdate (6.0) | Citric acid (182.8) | Stannous chloride dihyrate (3.7) | Triethylene tetramine (300) | Acrylic acid/methacylic acid copolymer *4 (20.0) | (15) | 512.5 | 4.5 | 0 | Yes | 5 |
| 16 | Sodium molybdate (6.0) | Citric acid (182.8) | Stannous chloride dihyrate (3.7) | Triethylene tetramine (300) | Phosphinic acid (20.0) | (16) | 512.5 | 2.9 | 0 | Yes | 5 |
| Comparative Example | | | | | | | | | | | |
| 17 | | | | | | (17) | 467.6 | 71 | 10 or less | No | 2 |
| 18 | | | | | | (17) | 567.6 | 65 | 10 or less | No | 2 |
| 19 | | | | | | (19) | 426.0 | 186 | 10 or less | No | 1 |
| Example | | | | | | | | | | | |
| 20 | Sodium molybdate (2.5) | Citric acid (100) | Stannous chloride dihydrate (1.0) | Diethylene triamine (50) | — | | 45.1 | 0 | Yes | 3 |
| 21 | Sodium molybdate (5.0) | Citric acid (200) | Stannous chloride dihyrate (2.0) | Diethylene triamine (100) | — | | 27.2 | 0 | Yes | 4 |
| 22 | Sodium | Citric | Stannous | Diethylene | | | 21.7 | 0 | Yes | 4 |

TABLE 6-continued

| Test No. | | | | | | Scale adhesion index *1 | Number of pitting (number/dm²) | Presence of film | Integrated evaluation *2 |
|---|---|---|---|---|---|---|---|---|---|
| | molybdate (10.0) | acid (300) | chloride dihydrate (5.0) | triamine (100) | | | | | |
| 23 | Sodium molybdate (10.0) | Citric acid (200) | Stannous chloride dihydrate (5.0) | Diethylene triamine (200) | — | 13.5 | 0 | Yes | 5 |
| 24 | Sodium molybdate (5.0) | Citric acid (150) | Stannous chloride dihydrate (5.0) | Diethylene triamine (250) | — | 11.0 | 0 | Yes | 5 |
| 25 | Sodium molybdate (20.0) | Citric acid (200) | Stannous chloride dihydrate (1.0) | Diethylene triamine (200) | — | 13.5 | 0 | Yes | 5 |
| 26 | Sodium molybdate (5.0) | Citric acid (200) | Stannous chloride dihydrate (10.0) | Diethylene triamine (200) | — | 13.5 | 0 | Yes | 5 |
| Comparative Example | | | | | | | | | |
| 27 | Sodium molybdate (10) | — | Stannous chloride dihydrate (4.0) | Diethylene triamine (450) | — | 153 | 11 or more | No | 1 |
| 28 | Sodium molybdate (10) | Gluconic acid (130) | — | Diethylene triamine (360) | — | 25.2 | 10 or more | No | 2 |
| 29 | Sodium molybdate (10) | Gluconic acid (450) | Stannous chloride dihydrate (40) | — | — | 167 | 11 or more | No | 1 |

| Test No. | Ingredients (mg/l) | | | | Other ingredient (mg/l) | Other ingredient (mg/l) | Scale adhesion index *1 | Number of pitting (number/dm²) | Presence of film | Integrated evaluation *2 |
|---|---|---|---|---|---|---|---|---|---|---|
| | (c) | (a) | (d) (in terms of metal) | (b) | | | | | | |
| Comparative Example | | | | | | | | | | |
| 30 | — | Citric acid (130) | Stannous chloride dihydrate (10) | Diethylene triamine (360) | — | — | 24.5 | 10 or less | No | 2 |
| 31 | Sodium molybdate dihydrate (0.5) | Citric acid (300) | Stannous chloride dihydrate (5) | Diethylene triamine (200) | — | — | 20.1 | " | " | 2 |
| 32 | Sodium molybdate dihydrate (10) | Citric acid (30) | Stannous chloride dihydrate (5) | Diethylene triamine (450) | — | — | 52.5 | " | " | 1 |
| 33 | Sodium molybdate dihydrate (10) | Citric acid (300) | Stannous chloride dihydrate (0.3) | Diethylene triamine (200) | — | — | 21.0 | " | " | 2 |
| 34 | Sodium molybdate dihydrate (10) | Citric acid (450) | Stannous chloride dihydrate (5) | Diethylene triamine (10) | — | — | 51.6 | " | " | 1 |
| 35 | Sodium molybdate dihydrate (17.0) | Citric acid (400) | Stannous chloride dihydrate (11) | Morpholine (100) | Poly sodium acrylate (40) *3 | Phosphinic acid *5 (25) | 20.7 | " | " | 2 |
| 36 | Sodium dihydrate (10.0) | Citric acid (300) | Stannous chloride dihydrate | morpholine (200) | Poly sodium acrylate | — | 100 | " | " | 1 |

TABLE 6-continued

| (5) | (20) |
|---|---|

*1 The scale adhesion index was calculated from the calculation equation shown below, using the average weight of calcium adhering to the high-load heat transfer tube Nos. 1 and 3.

Scale adhesion index =

$$\left( \frac{\text{Weight of calcium adhering to high-load heat transfer during use of test agent (mg)}}{\text{Weight of calcium adhering to high-load heat transfer portion during use of agent of test No. 36 (mg)}} \right) \times 100$$

The agent of Test No. 36 is a typical agent of the invention disclosed in Japanese Patent Publication No. 62-27157 of the applicant (describe above as prior art in "BACKGROUND OF THE INVENTION") and it has the best effect as prior art. This agent was used as a control for the purpose of further clarifying the effect of the present invention. The deposit of hardness ingredients was measured by washing each of the heat transfer portions (test tubes) with a 30% nitric acid solution and then subjecting the wash to atomic absorption spectrophotometry.

*2 The criteria used for integrated evaluation were as follows:

5 ... The number of pitting is zero (number/dm$^2$), an anticorrosive film is present, and the scale adhesion index is 20 or less. Under these circumstances, it is generally believed that an agent is very good.

4 ... The number of pitting is zero (number/dm$^2$), an anticorrosive film is present, and the scale adhesion index is 21 to 35. Under these circumstances, it is generally believed that an agent is usable.

3 ... The number of pitting is zero (number/dm$^2$), an anticorrosive film is present, and the scale adhesion index is 36 to 50. Under these circumstances, it is generally believed that an agent is usable.

2 ... The number of pitting is 1 to 10 (number/dm$^2$), an anticorrosive film is absent, and the scale adhesion index is 51 or more. Under these circumstances, it is generally believed that an agent is unusable.

1 ... The number of pitting is 1 to 10 (number/dm$^2$), an anticorrosive film is absent, and the scale adhesion index is 101 or more. Alternatively, the number of pitting is 11 or more (number/dm$^2$), an anticorrosive film is absent, and the scale adhesion index is 51 or more. Under these circumstances, it is generally believed that an agent is unusable.

*3 Molecular weight: about 8000
*4 Molecular weight: about 8000. Reaction molar ratio: 1:1
*5 The same phosphinic acid as used in Formulation No. 16.

When the film formed in an example (Test No. 6) of the present invention was subjected to X-ray diffraction analysis, the same X-ray diffraction pattern as that shown in FIG. 1 was obtained. Triiron tetroxide was recognized by searching for the pattern in the ASTM cards. No other iron oxides were detected. This reveals that the component of the film is triiron tetroxide.

When the surface of a section of the film was observed under an electron microscope, it was observed that the film had an extremely dense form having no defective portion and a uniform thickness.

When a section of the film was measured by an X-ray microanalyzer, it was observed that triiron tetroxide reached the surface layer of the base material in the same way as shown in FIG. 2.

Further, when the specimen on which the film was formed was examined with respect to IR absorption by reflection IR, the presence of an organic substance was not detected, and it was observed that the film contained neither polyalkylene polyamine nor aliphatic hydroxycarboxylic acid.

As described above, the present invention is capable of preventing corrosion of a ferrous metal in the water system of pure water or soft water boilers, particularly pitting corrosion, or significantly suppressing such corrosion, without the need of deoxidation treatment. Even when impurity ingredients or hardness ingredients are present in the boiler water, the compositions of the present invention are effective.

Moreover, it should be understood that the preferred embodiments and examples described are for illustrative purposes only and are not to be construed as limiting the scope of the present invention which is properly delineated only in the appended claims.

What is claimed is:

1. A water treatment composition for boilers comprising as active ingredients a compound able to release aliphatic hydroxycarboxylic acid ions in water or an acid addition salt thereof, and a polyamine represented by the following formula (I):

$$H_2N(CH_2CH_2NH)_nH \quad (I)$$

wherein n denotes an integer of 2 to 5, said active ingredients being present in a molar ratio of 12:1 to 1:10.

2. The water treatment composition for boilers according to claim 1, wherein the compound, which is able to release aliphatic hydroxycarboxylic acid ions in water, is at least one selected from the group consisting of a citric acid, gluconic acid, malic acid, mannonic acid and sodium potassium or ammonium salts thereof, and glucono-δ-lactone.

3. The water treatment composition according to claim 1, wherein the polyamine represented by the formula (I) or the acid addition salt is at least one selected from the group consisting of a diethylenetriamine, triethylenetetramine, tetraethylenepentamine, pentaethylenehexamine and inorganic acid salts thereof.

4. The water treatment composition according to claim 1, wherein both the compound which is able to release aliphatic hydroxycarboxylic acid ions and the polyamine represented by the formula (I) are present in the form of a salt.

5. The water treatment composition according to claim 1, further comprising a water soluble dispersant.

6. The water treatment composition according to claim 1, further comprising a monamine having 2 to 8 carbon atoms.

7. The water treatment composition according to claim 1, further comprising at least one compound selected from the group consisting of molybdic acid, tungstic acid, nitrous acid and alkali salts thereof and a heavy metal compound which is able to release one of zirconium, tin, manganese and nickel ions in water.

8. A water treatment method for pure water boilers comprising adding to the water system of a pure water boiler 0.2 to 50 epm of a compound which is able to release aliphatic hydroxycarboxylic acid ions in water or an acid addition salt thereof, and a polyamine represented by the following formula (I):

$$H_2N(CH_2CH_2NH)_nH \quad (I)$$

wherein n denotes an integer of 2 to 5, so as to prevent corrosion of the ferrous metal in said water system of said pure water boiler.

9. A water treatment method for soft water boilers comprising adding to the water system of a soft water boiler the following compounds:
a) 50 to 5,000 mg/l of a compound which is able to release aliphatic hydroxycarboxylic acid ions in water;
b) 20 to 5,000 mg/l of a polyamine represented by the following formula (I):

$$H_2N(CH_2CH_2NH)_nH \qquad (I)$$

wherein n denotes an integer of 2 to 5 or an acid addition salt thereof;
c) 1 to 100 mg/l of at least one compound selected from the group consisting of molybdic acid, tungstic acid, nitrous acid and alkali salts thereof; and
d) a heavy metal compound which is able to release one of zirconium, tin, manganese and nickel ions in water, in an amount of 0.5 to 100 mg/l of metal ion; so as to prevent corrosion of the ferrous metal in said water system of said soft water boiler.

* * * * *